United States Patent Office 3,066,155
Patented Nov. 27, 1962

3,066,155
3β-CYCLOPENTYL-ANDROSTANE AND PREGNANE DERIVATIVES
Lawrence H. Knox, Mexico City, Mexico, assignor, by mesne assignments, to Syntex Corporation, a corporation of Panama
No Drawing. Filed June 19, 1961, Ser. No. 117,847
25 Claims. (Cl. 260—397.3)

The present invention relates to novel cyclopentano-phenanthrene compounds and to a process for the production thereof.

More particularly the present invention relates to novel 3-cyclopentadienyl and 3β-cyclopentyl-androstane and pregnane derivatives.

The novel compounds of the present invention are represented by the following formulas:

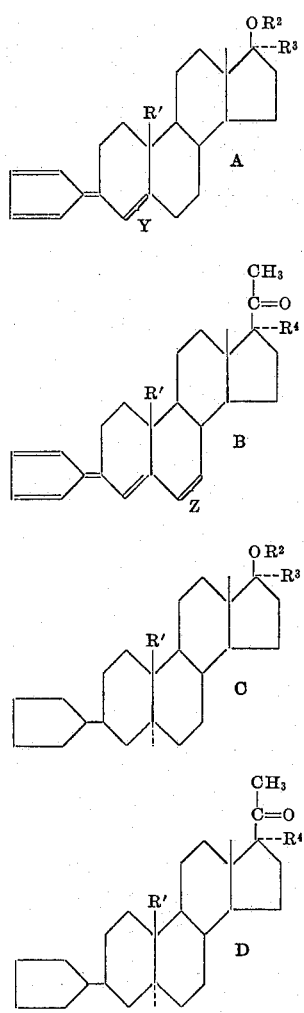

In the above formulas Y represents a double bond or a saturated linkage between C–4 and C–5; Z represents a double bond or a saturated linkage between C–6 and C–7; $R^1$ represents hydrogen or methyl; $R^2$ represents hydrogen or a hydrocarbon carboxylic acyl group of less than 12 carbon atoms; $R^3$ represents hydrogen or a lower alkyl group and $R^4$ represents hydrogen or the group —$OR^5$ wherein $R^5$ represents hydrogen or a hydrocarbon carboxylic acyl group of less than 12 carbon atoms.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by Formulas A and C are androgenic type hormones possessing anabolic properties and anti-estrogenic activity.

The compounds represented by Formulas B and D are progestational agents exhibiting anti-ovulatory, anti-androgenic and anti-estrogenic activities.

The novel compounds of the present invention are prepared by the process illustrated by the following equation:

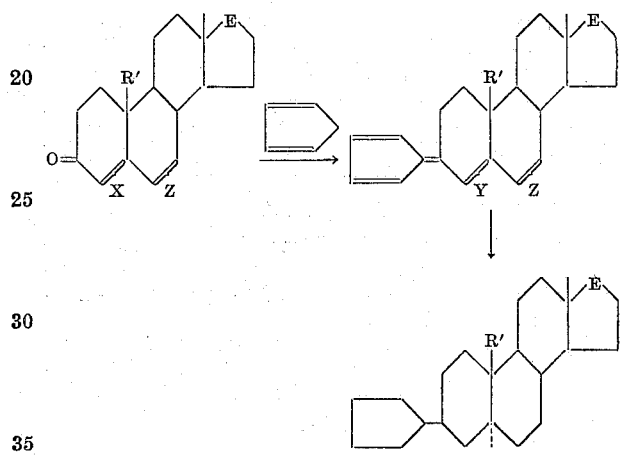

In the above formulas, E represents

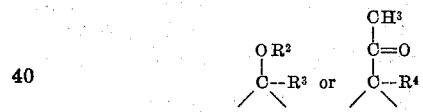

$R^1$, $R^2$, $R^3$, $R^4$, Y and Z have the same meaning as hereinabove set forth.

In practicing the process outlined above, the 3-keto-androstane or pregnane derivative, or the corresponding 19-nor compound, is treated with cyclopentadiene in the presence of an alkali metal lower alkoxide, such as sodium ethoxide, for a period of time that may vary from 1 to 16 hours giving the corresponding 3-cyclopentanodi-enylidene derivative. Hydrogenation of this compound in the presence of a suitable catalyst such as platinum oxide affords the 3β-cyclopentyl derivative of the corresponding saturated androstane or pregnane or the respective 19-nor-compound.

The following specific examples serve to illustrate but are not intended to limit the scope of the present invention:

*Example 1*

To a solution of 0.30 g. of sodium in 20 cc. of ethanol was added rapidly a second solution of 2.9 g. of dihydro-allotestosterone in 25 cc. of ethanol containing 6 cc. of freshly distilled cyclopentadiene. The mixture was kept at room temperature for one hour and then at 0° C. for an additional hour. The crystalline product thus formed was filtered off, washed with cold ethanol and dried in vacuo, thus furnishing 3-cyclopentadienyliden-androstan-17β-ol. The product has a melting point of 185–87° C.; $[α]_D$ +13.2° ($CHCl_3$); $λ_{max.}$ 280 mμ, log ε=4.36.

Following the above technique was treated 19-nor-dihy-droallotestosterone affording 3-cyclopentadienylidene-19-nor-androstan-17β-ol.

Example II

A suspension of 2 g. of 3-cyclopentadienyliden-androstan-17β-ol in 20 ml. of ethanol was shaken with 200 mg. of platinum oxide under an atmosphere of hydrogen until 3 molar equivalents of this gas were absorbed. Removal of the catalyst by filtration and evaporation to dryness of the filtrate gave a solid residue which upon crystallization from hexane afforded 3β-cyclopentyl-androstan-17β-ol with a melting point of 112–14° C.; $[\alpha]_D$ +12° (CHCl$_3$).

Upon hydrogenation of 3-cyclopentadienylidene-19-nor-androstan-17β-ol was obtained 3β-cyclopentyl-19-nor-androstan-17β-ol.

Example III

A solution of 3 g. of 17α-methyl-androstan-17β-ol-3-one and 6 cc. of freshly distilled cyclopentadiene in 35 ml. of ethanol was added to a solution of 480 mg. of sodium in 20 cc. of ethanol. After 16 hours at room temperature, the mixture was poured into cold water, the formed precipitate was filtered off, washed with water and dried in vacuo. Recrystallization from ethanol afforded 3-cyclopentadienylidene - 17α - methyl-androstan-17β-ol with a melting point of 155–57° C.; $[\alpha]_D$ −7.4° (CHCl$_3$); $\lambda_{max.}$ 280 m$\mu$, log $\epsilon$=4.36.

17α-methyl-19-nor-androstan-17β-ol-3-one was treated exactly by the above technique giving 3-cyclopentadienylidene-17α-methyl-19-nor-androstan-17β-ol.

Example IV 2 g. of 3-cyclopentadienylidene-17α-methyl-androstan-17β-ol were hydrogenated following the technique described in Example II, furnishing 3β - cyclopentyl - 17α-methyl-androstan-17β-ol.

By the same technique, there was treated 3-cyclopentadienylidene-17α-19-nor-androstan-17β-ol forming 3-cyclopentyl-17α-methyl-19-nor-androstan-17β-ol.

Example V 3 g. of testosterone were treated following the procedure described in Example III, furnishing 3-cyclopentadienyliden-$\Delta^4$-androsten-17β-ol with a melting point of 190–194° C.; $[\alpha]_D$ +331.6° (CHCl$_3$); $\lambda_{max.}$ 328–30 m$\mu$, log $\epsilon$=4.54.

19-nor-testosterone was treated by the same technique giving 3-cyclopentadienylidene - 19 - nor - $\Delta^4$-androsten-17β-ol.

Example VI 3 g. of progesterone were treated in accordance with Example III, affording 3-cyclopentadienylidene-$\Delta^4$-pregnene-20-one, with a melting point of 160–62° C.; $[\alpha]_D$ +428° (CHCl$_3$); $\lambda_{max.}$ 328–330 m$\mu$, log $\epsilon$=4.52.

Upon treatment of 19-nor-progesterone by the same technique there was obtained 3-cyclopentadienylidene-19-nor-$\Delta^4$-pregnen-20-one.

Example VII 2 g. of 3-cyclopentadienylidene-$\Delta^4$-pregnen-20-one was hydrogenated following the technique described in Example II, with the only variation that the operation was continued until 4 molar equivalents of hydrogen had been absorbed. The compound obtained was 3β-cyclopentyl-allopregnan-20-one with a melting point of 87–9° C.; $[\alpha]_D$ +112° (CHCl$_3$).

3-cyclopentadienyliden - 19-nor-$\Delta^4$-pregnen-20-one was hydrogenated by the same technique furnishing 3β-cyclopentyl-19-nor-allopregnan-20-one.

Example VIII 3 g. of 6-dehydro-17α-hydroxy-progesterone (obtained by chloranil dehydrogenation of 17α-hydroxy-progesterone) was treated following the technique described in Example III affording 3-cyclopentadienyliden-17α-hydroxy-$\Delta^{4,6}$-pregnadien-20-one with a melting point of 210–12° C.; $[\alpha]_D$ +193° (CHCl$_3$); $\lambda_{max.}$ 364 m$\mu$, log $\epsilon$=4.67.

6-dehydro-17α-hydroxy-19 - nor-progesterone obtained by chloranil dehydrogenation of 17α-hydroxy-19-nor-progesterone, was treated by the same method furnishing 3-cyclopentadienylidene - 17α - hydroxy - 19 - nor - $\Delta^{4,6}$-pregnadien-20-one.

Example IX

Following the technique described in Example II (except that 5 molar equivalents of hydrogen were allowed to be absorbed by the compounds) there were hydrogenated 3 - cyclopentadienylidene - 17α - hydroxy-$\Delta^{4,6}$-pregnadien-20-one and 3-cyclopentadienylidene-17α-hydroxy-19-nor-$\Delta^{4,6}$-pregnadien-20-one affording correspondingly 3β - cyclopentyl - 17α - hydroxy-allopregnan-20-one and 3β-cyclopentyl-17α-hydroxy-19-nor-allopregnan-20-one.

Example X 1 g. of 3-cyclopentadienyliden-androstan-17β-ol in 10 cc. of pyridine was treated with acetic anhydride. The mixture was kept overnight at room temperature, then poured into cold water. The formed precipitate was filtered off, washed with water and dried in vacuo.

Recrystallization from acetone-hexane afforded the 17-acetate of 3-cyclopentadienyliden-androstan-17β-ol.

Following the same technique, there were treated the compounds listed hereinafter with the indicated agent affording the corresponding products named below:

| Starting compound | Acylating agent | Product |
| --- | --- | --- |
| 3-cyclopentadienyliden-androstan-17β-ol. | Propionic anhydride. | 17-propionate of 3-cyclopentadienyliden-androstan-17β-ol. |
| 3-cyclopentadienylidene-19-nor-androstan-17β-ol. | Caproic anhydride. | 17-caproate of 3-cyclopentadienylidene-19-nor-androstan-17β-ol. |
| Do. | Cyclopentyl-propionic anhydride. | 17-cyclopentylpropionate of 3-cyclopentadienylidene-19-nor-androstan-17β-ol. |
| 3β-cyclopentyl-androstan-17β-ol. | Benzoyl chloride. | 17-benzoate of 3β-cyclopentyl-androstan-17β-ol. |
| Do. | Propionic anhydride. | 17-propionate of 3β-cyclopentyl-androstan-17β-ol. |
| 3β-cyclopentyl-19-nor-androstan-17β-ol. | Caproic anhydride. | 17-caproate of 3β-cyclopentyl-19-nor-androstan-17β-ol. |
| Do. | Acetic anhydride. | 17-acetate of 3β-cyclopentyl-19-nor-androstan-17β-ol. |
| 3-cyclopentadienyliden-$\Delta^4$-androsten-17β-ol. | Cyclopentyl-propionic anhydride. | 17-cyclopentylpropionate of 3-cyclopentadienyliden-$\Delta^4$-androsten-17β-ol. |
| Do. | Benzoyl chloride. | 17-benzoate of 3-cyclopentadienyliden-$\Delta^4$-androsten-17β-ol. |
| 3-cyclopentadienyliden-19-nor-$\Delta^4$-androsten-17β-ol. | Caproic anhydride. | 17-caproate of 3-cyclopentadienylidene-19-nor-$\Delta^4$-androsten-17β-ol. |
| Do. | Benzoyl chloride. | 17-benzoate of 3-cyclopentadienylidene-19-nor-$\Delta^4$-androsten-17β-ol. |

Example XI

A solution of 1 g. of 3-cyclopentadienylidene-17α-methyl-androstan-17β-ol, 1 g. of p-toluenesulfonic acid monohydrate, 50 cc. of acetic acid and 10 cc. of acetic anhydride after one hour reaction at room temperature was poured into water and stirred until the excess anhydride had hydrolyzed. Isolation of the product by ethyl acetate extraction and crystallization of the residue from acetone-ether gave the 17-acetate of 3-cyclopentadienyliden-17α-methyl-androstan-17β-ol.

Following the same technique there were treated the compounds listed below with the indicated anhydride affording the corresponding products hereinafter set forth.

| Starting compound | Acylating agent | Product |
|---|---|---|
| 3-cyclopentadienyli- dene-17α-methyl- androstan-17β-ol. | Propionic anhy- dride. | 17-propionate of 3-cyclo- pentadienylidene-17α- methyl-androstan-17β- ol. |
| 3-cyclopentadienyli- dene-17α-methyl- 19-nor-androstan- 17β-ol. | Caproic anhydride | 17-caproate of 3-cyclo- pentadienylidene-17α- methyl-19-nor-andro- stan-17β-ol. |
| Do | Cyclopentylpro- pionic anhydride. | 17-cyclopentylpropionate of 3-cyclopentadienyli- dene-17α-methyl-19- nor-androstan-17β-ol. |
| 3-cyclopentadienyli- dene-17α-hydroxy- Δ⁴-pregnen-20-one. | Acetic anhydride | 17-acetate of 3-cyclopent- adienylidene-17α-hy- droxy-Δ⁴-pregnen-20- one. |
| Do | Propionic anhy- dride. | 17-propionate of 3-cyclo- pentadienylidene-17α- hydroxy-Δ⁴-pregnen- 20-one. |
| 3β-cyclopentyl-17α- methyl-androstan- 17β-ol. | Caproic anhydride | 17-caproate of 3β-cyclo- pentyl-17α-methyl- androstan-17β-ol. |
| Do | Cyclopentylpro- pionic anhydride. | 17-cyclopentylpropionate of 3-cyclopentyl-17α- methyl-androstan-17β- ol. |
| 3β-cyclopentyl-17α- methyl-19-nor-an- drostan-17β-ol. | Acetic anhydride | 17-acetate of 3β-cyclo- pentyl-17α-methyl-19- nor-androstan-17β-ol. |
| Do | Cyclopentyl-pro- pionic anhydride. | 17-cyclopentylpropionate of 3β-cyclopentyl-17α- methyl-19-nor-andro- stan-17β-ol. |
| 3β-cyclopentyl-17α- hydroxy-allopreg- nan-20-one. | Caproic anhydride | 17-caproate of 3β-cyclo- pentyl-17α-hydroxy- allopregnan-20-one. |
| Do | Propionic anhy- dride. | 17-propionate of 3β-cyclo- pentyl-17α-hydroxy- allopregnan-20-one. |
| 3β-cyclopentyl-17α- hydroxy-19-nor- allopregnan-20-one. | Acetic anhydride | 17-acetate of 3β-cyclo- pentyl-17α-hydroxy- 19-nor-allopregnan-20- one. |
| Do | Cyclopentyl-pro- pionic anhydride. | 17-cyclopentylpropionate of 3β-cyclopentyl-17α- hydroxy-19-nor-allo- pregnan-20-one. |

I claim:

1. A compound of the following formula:

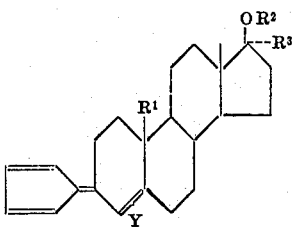

wherein Y is selected from the group consisting of a double bond and a saturated linkage between C–4 and C–5; $R^1$ is selected from the group consisting of hydrogen and methyl; $R^2$ is selected from the group consisting of hydrogen and a hydrocarbon carboxylic acyl group of less than 12 carbon atoms and $R^3$ is selected from the group consisting of hydrogen and lower alkyl.

2. 3-cyclopentadienyliden-androstan-17β-ol.
3. 3-cyclopentadienylidene-19-nor-androstan-17β-ol.
4. 3-cyclopentadienylidene - 17α - methyl - androstan-17β-ol.
5. 3 - cyclopentadienyliden - 17α - methyl - 19 - nor-androstan-17β-ol.
6. 3-cyclopentadienyliden-Δ⁴-androsten-17β-ol.
7. 3 - cyclopentadienylidene - 19 - nor - Δ⁴-androsten-17β-ol.
8. The 17-acetate of 3-cyclopentadienyliden-androstan-17β-ol.
9. A compound of the following formula:

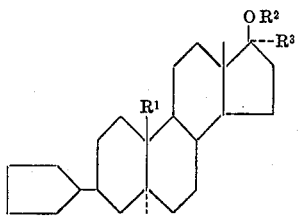

wherein $R^1$ is selected from the group consisting of hydrogen and methyl; $R^2$ is selected from the group consisting of hydrogen and a hydrocarbon carboxylic acyl group of less than 12 carbon atoms and $R^3$ is selected from the group consisting of hydrogen and lower alkyl.

10. 3-cyclopentyl-androstan-17β-ol.
11. 3-cyclopentyl-17α-methyl-19-nor-androstan-17β-ol.
12. The 17-propionate of 3-cyclopentyl-androstan-17β-ol.
13. A compound of the following formula:

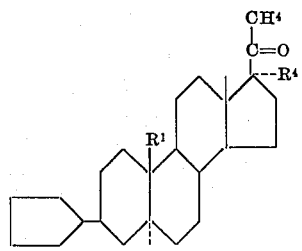

wherein Z is selected from the group consisting of a double bond and a saturated linkage between C–6 and C–7; $R^1$ is selected from the group consisting of hydrogen and methyl and $R^4$ is selected from the group consisting of hydrogen, hydroxy and hydrocarbon carboxylic acyloxy of less than 12 carbon atoms.

14. 3-cyclopentadienylidene-Δ⁴-pregnen-20-one.
15. 3-cyclopentadienylidene-19-nor-Δ⁴-pregnen-20-one.
16. 3 - cyclopentadienylidene-17α-hydroxy-Δ⁴-pregnen-20-one.
17. 3 - cyclopentadienylidene - 17α-hydroxy-19-nor-Δ⁴-pregnen-20-one.
18. The 17-acetate of 3-cyclopentadienylidene-17α-hydroxy-Δ⁴-pregnen-20-one.
19. A compound of the following formula:

wherein $R^1$ is selected from the group consisting of hydrogen and methyl and $R^4$ is selected from the group consisting of hydrogen, hydroxy and hydrocarbon carboxylic acyloxy of less than 12 carbon atoms.

20. 3β-cyclopentyl-allopregnan-20-one.
21. 3β-cyclopentyl-19-nor-allopregnan-20-one.
22. 3β-cyclopentyl-17α-hydroxy-allopregnan-20-one.
23. The 17-caproate of 3β-cyclopentyl-17α-hydroxy-allopregnan-20-one.
24. A process for the production of a compound selected from the group consisting of a 3-cyclopentadienyliden-androstane and a 3-cyclopentadienyliden-allopregnane which comprises treating the corresponding 3-keto compound with cyclopentadiene in the presence of an alkali metal lower alkoxide.
25. 3 - cyclopentadienylidene - 17α-hydroxy-Δ⁴,⁶-pregnadien-20-one.

No references cited.